Aug. 20, 1957  D. J. ALDINGER  2,803,451
PRESSURE REGULATORS

Filed Dec. 27, 1952  2 Sheets-Sheet 1

INVENTOR.
DONALD J. ALDINGER
BY
D. Clyde Jones
ATTORNEY

Aug. 20, 1957  D. J. ALDINGER  2,803,451
PRESSURE REGULATORS
Filed Dec. 27, 1952  2 Sheets-Sheet 2

INVENTOR.
DONALD J. ALDINGER
BY
D. Clyde Jones
ATTORNEY

United States Patent Office 2,803,451
Patented Aug. 20, 1957

2,803,451

PRESSURE REGULATORS

Donald J. Aldinger, West Webster, N. Y., assignor to Taylor Instrument Companies, Rochester, N. Y., a corporation of New York Application December 27, 1952, Serial No. 328,221

2 Claims. (Cl. 267—1)

This invention relates to pressure regulators and more particularly to an improved regulator or reducing valve such as is employed in connecton with a pressure-operated indicating apparatus used in operating a pneumatic control and recording system as disclosed, for example, in the Di Maggio Patent 2,594,136 assigned to the same assignee as this application.

As pointed out in this patent, a pressure regulator or reducing valve identified by the numeral 59 is mounted at the rear end of a case 5—6—7—8 which it is desired to keep relatively small and is therefore more or less compactly filled with various other elements of the control system.

Figure 1:
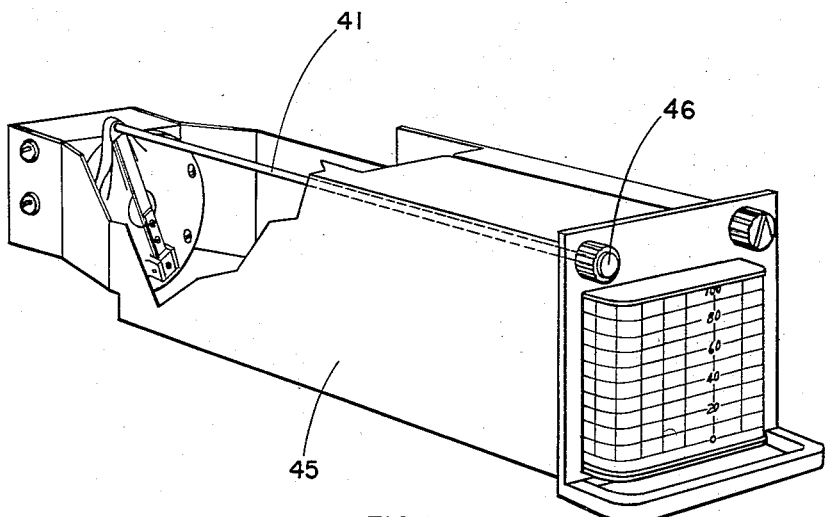

Inasmuch as this type of valve must be axially spring loaded, it is provided with a helical compression spring which, as is the case with regard to all such valves known to applicant, is centrally or axially positioned so that the spring compressing or valve adjusting rod, such as the rod identified by the numeral 58 in the Di Maggio patent, must of necessity enter the center of the regulator. As illustrated by Fig. 1 of this patent, the adjusting rod operating knob 57 must be positioned for operation from the front of the case while the valve itself must be rather remotely positioned with respect to the operating knob behind or in back of the front of the case. Thus, because of these limitations and the difficulty of positioning the adjusting rod centrally within the case without interference with the elements therein, the location of the valve relative to these elements has been quite strictly limited to the position illustrated by Fig. 9 of the Di Maggio patent where, it will be observed that, the reducing valve undesirably projects beyond both the rear end and the bottom of the otherwise compact and relatively small case.

It is therefore one of the objects of this invention to provide a pressure regulator or reducing valve having an adjusting rod so positioned as to permit location of the valve itself in any convenient position with respect to the valve support such as the casing described in the above mentioned Di Maggio patent.

It is also an object of this invention to provide a reducing valve which will permit the positioning thereof within such a casing and thereby considerably reduce the overall length and breadth occupied by the valve and casing combined.

It is a further object of this invention to provide an improved spring loaded regulating valve in connection with which the loading force is applied axially or at the center of the valve while the adjusting or regulating force is applied off center.

Figures 4, 5:
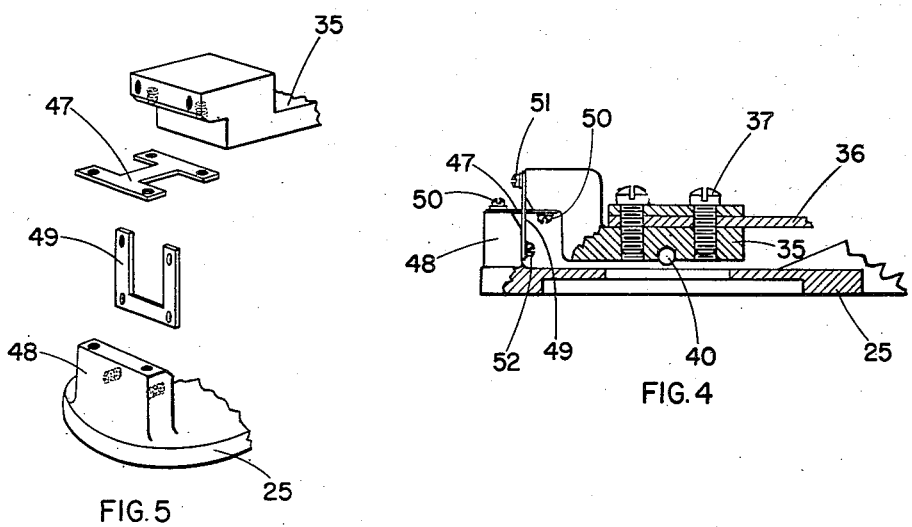
Figure 2:
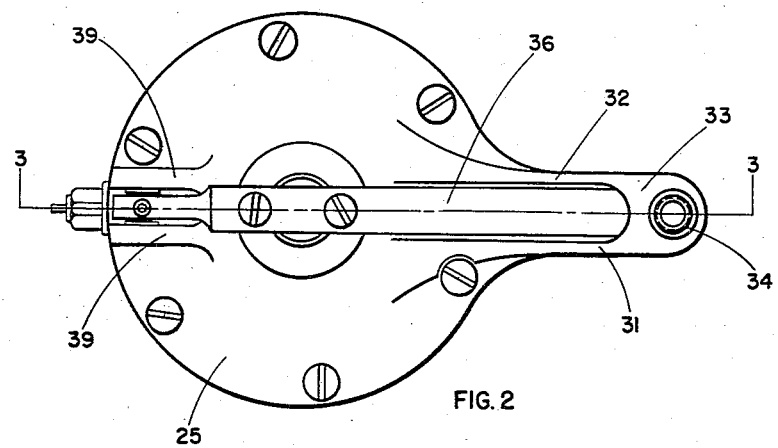
Figure 6:
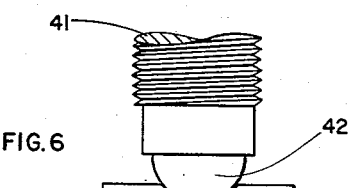
Figure 3:
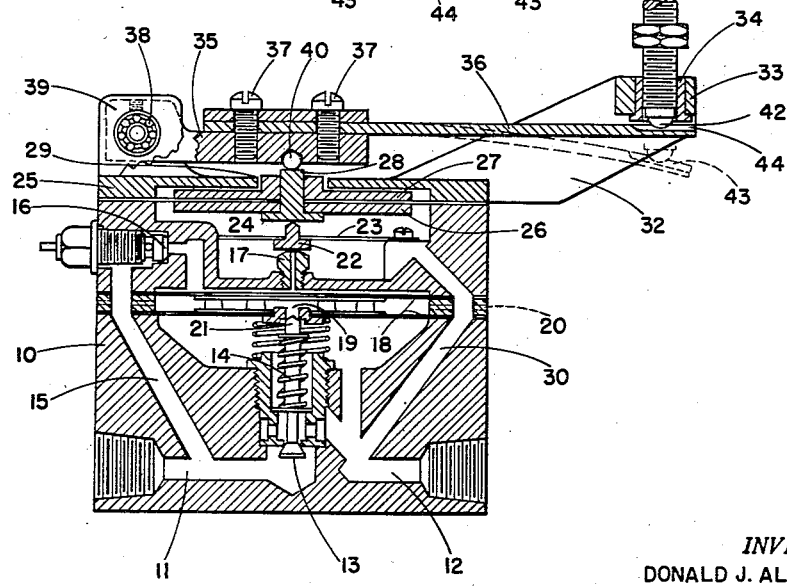

The invention will be better understood from the following description when taken in connection with the accompanying drawings and the scope of the invention will be pointed out in the appended claims. In the drawings, Fig. 1 is a perspective view of a casing containing elements of a pneumatic control and recording system with the regulator of the invention mounted thereon; Fig. 2 is a plan or front view of the regulator as viewed looking from the front toward the rear of the casing; Fig. 3 is a cross-sectional view of the regulator taken on the line 3—3 of Fig. 2; Fig. 4 is a partial cross-sectional view illustrating a modification of the invention; Fig. 5 is an exploded perspective view better to illustrate the Fig. 4 modification, and Fig. 6 illustrates an enlarged view of the end of the valve adjusting or regulating rod in engagement with an important element of the invention.

Referring now to Figures 2 and 3 particularly, I have illustrated a pressure regulator or reducing valve comprising an enclosing housing or casing 10 provided with a fluid supply port 11 and a fluid output port 12 to which fluid conduits may be respectively connected by means of the tapped openings illustrated. Fluid enters the supply port 11 and divides into two streams, one of which goes directly to an inner valve 13 which is spring seated by a spring 14 while the other of which passes through a passage 15 to a restriction 16 therein where it is bled to a nozzle 17 and the space adjacent one side of a double diaphragm assembly 18. The opposite or lower side of the diaphragm assembly 18 is subjected to the reduced pressure which may be bled through an opening 19 to the space between the double diaphragms and so to atmosphere through apertures 20 except when the pressure on the upper surface of the diaphragm is sufficient to move the double diaphragm and the valve seat of opening 19 down into engagement with a valve 21 defined by the upper end of the stem of valve 13. Thus, the valve 13, and stem thereof are positioned by the location of the double diaphragm assembly 18 which has the fluid, such as air, reduced in pressure applied on its lower surface with the back pressure from nozzle 17 applied on its upper surface.

The nozzle back pressure is determined by the position of a baffle 22 fixed to a flexible metallic strip 23 positioned in the center of a top chamber 24 having a movable wall, the location of which in turn determines the baffle position. The movable wall may be a piston, for example, or as illustrated comprises a flexible diaphragm assembly clamped between the valve casing and a cover 25 sealingly screwed or bolted to the casing and including a pair of rigid plates 26 and 27 between which a central portion of the flexible diaphragm is clamped and to which is fixed an axially extending column 28. The lower end of the column is engageable with baffle 22 and the upper end together with a central boss portion of the upper plate 27 is reciprocally movable in a direction parallel to the central axis of the valve through an opening 29 in cover 25. As illustrated, the reduced output pressure is also in communication through a passage 30 with top chamber 24 and thus acts upwardly on the lower surface of the upper diaphragm assembly.

As thus far described, the regulator or reducing valve is more or less identical to the well known prior art type hereinbefore mentioned as being employed by Di Maggio and in connection with which an axially positioned spiral compression spring is utilized to exert a downward force on the upper surface of the upper diaphragm in opposition to the balancing force of the reduced pressure and thereby adjust or regulate the magnitude of the same as well understood in the art.

However, in accordance with this invention, the spiral compression spring has been eliminated and the valve casing or cover 25 is provided with a pair of parallel and spaced arms 31 and 32 extending generally transversely from the casing and joined by an integral portion 33 at the outer extremity thereof. A nut 34 is fixedly mounted in joining portion 33 with the axis thereof substantially parallel to the central axis of the valve itself. In addition, a lever system is provided comprising a lever of resilient material which upon deformation caused by a force, pressure or shock applied thereto is subsequently capable of springing back to a former shape unchanged or undamaged as distinguished from a rigid material which would be permanently deformed. The lever may be entirely of resilient material fixedly supported at one end but preferably comprises a rigid portion 35 as illustrated and an elongated resilient portion 36 fixed adjacent an end thereof in any suitable manner, such as by screws 37, to rigid portion 35. The lever rigid portion is supported adjacent an end thereof on some part of the regulator casing such as the cover 25 as illustrated. More specifically, the lever is pivotally mounted or supported on anti-friction bearings 38 for rotation between a pair of ears 39 extending upwardly from the casing cover while a hardened metallic ball 40 is force or press fitted into the lower surface of the rigid portion for anti-frictional engagement thereof with the upper end of diaphragm column 28. The elongated spring or resilient portion 36 extends transversely to the axis of the regulator between and in spaced relation to arms 31 and 32 with the outer or free end, opposite the fixed end thereof, positioned adjacent nut 34.

A valve regulating or adjusting rod 41 terminates in a hemispherical portion 42 which may be a hardened steel ball embedded in the end of the rod and is provided with a threaded portion engageable in and adjustable with respect to nut 34 for engagement of the rod with the lever resilient portion 36. The hemispherical portion 42 directly engages the bevelled edges 43 of a slot, or as shown, a groove 44 provided adjacent the end of the lever so that the resulting point contact between these two elements, as better shown by Fig. 6, amounts to substantially anti-frictional engagement when the lever is flexed by the rod in the manner illustrated by the broken lines of Fig. 3.

When thus flexed, the lever exhibits a spring rate, axially, upon the upper diaphragm or at the point of engagement of the lever with diaphragm column 28 equivalent to the product of the spring rate of the resilient portion 36 of the lever and the square of the ratio of the distance from the fulcrum or pivot point at bearing 38 to the opposite end of the rigid portion 35 to the lever arm distance from the pivot 38 to the point of engagement of the lever with diaphragm column 28.

A pressure regulator or reducing valve has thus been provided which is spring loaded at the center or axially, although the adjusting or regulating force proper is applied off-center whereby the valve may be centrally positioned wholly within a case 45 as illustrated by Fig. 1 with the adjusting or regulating rod 41 extending therethrough without interference with other elements in the case and with the regulating rod knob 46 remotely positioned for operation at the front of the case. It will, of course, be obvious that the cover 25 and elements mounted thereon may be rotated during assembly to practically any position with respect to the body proper of the regulator as long as the equally spaced cap screw openings therein are aligned with the tapped openings having the same equal spacing in the body portion. It follows, therefore, that the regulator may be mounted in the case 45 so that the adjusting rod may extend adjacent any corner of the casing as well as adjacent the one illustrated with the adjusting knob 46 located at various positions on the front panel in addition to the particular position shown at the upper left hand corner.

As a result of this arrangement, the overall space occupied by the case is reduced since the regulator no longer extends beyond the back nor the bottom of the case. In addition, however, the overall length is further reduced as a direct result of the elimination of an axially positioned spiral compression or loading spring which obviously occupied a relatively large space in an axial direction even when completely compressed. Moreover, the total amount of axial movement of the lever of this invention is relatively small compared to the movement of the former spiral spring. For example, compression of the prior art spiral spring through the complete range of adjustments necessitated a central or axial movement of from three-eighths to one-half inch while the total axial movement of the lever at the axis of the regulator or at ball 40 for the same range of adjustments is in the order of thousandths of an inch.

Inasmuch as the loading force at the free end of lever 36 and the reactive force at ball 40 results in a considerable force at the fulcrum of the lever, the resulting frictional force at this point must be kept at a minimum to maintain the accuracy of the instrument and for this reason the lever is pivoted on anti-friction bearings, such as the ball bearing illustrated in Figure 3. However, the friction of even ball or needle type bearings may be increased by being subjected to dirty or corrosive atmospheres or fluid.

I have therefore illustrated in Figures 4 and 5, as a modification of the pivot mount, a flexible cross leaf arrangement comprising a semi-rigid but flexible member 47 of resilient material such as strip stainless steel fixedly connected to an end portion of the lever and to a portion of the regulator housing such as a boss 48 on the cover 25. Another flexible member 49 spaced from and crossing member 47 at an angle with respect thereto is likewise fixedly connected to portions of the lever and cover boss respectively adjacent the portions thereof to which the member 47 is connected. More specifically and referring particularly to Figure 5, resilient member 47 is of I-shaped configuration with the flange portions thereof fixed by screws 50 respectively to boss 48 and to a substantially horizontal surface of the lever rigid portion 35 while member 49 is of U-shaped configuration with the free ends of the legs thereof fixed by screws 51 to a vertical surface of lever 35 and with the leg connecting portion fixed by screws 52 to a substantially parallel vertical surface of boss 48 in such a manner that the web portion of the I-shaped member extends intermediate and is spaced from the legs of the U-shaped member.

While I have in accordance with the patent statutes shown and described a particular embodiment of my invention and a modification thereof, it will be obvious that changes and modifications can be made without departing from the invention in its broader aspects and I, therefore, aim in the appended claims to cover all such changes and modifications as fall within the true spirit and scope of the invention.

What I claim as new and desire to secure by Letters Patent of the United States is:

1. Pressure regulating means for the application of a loading force to an element positioned within a stationary housing comprising a lever having a rigid portion and an elongated resilient portion, said rigid portion being pivotally mounted at one end thereof on said housing and having a portion spaced from said pivot mount engageable with said element, said elongated resilient portion being fixed adjacent one end thereof to said rigid portion and projecting beyond and away from the end of said rigid portion remote from the pivotally mounted end thereof, and means for application of a loading force adjacent the end of said resilient portion opposite said fixed end thereof whereby said lever may be flexed to apply a loading force at said engageable portion to said element, said rigid portion being otherwise unrestrained and freely rotatable about said pivot mount toward and away from said element.

2. The combination of pressure regulating means and a support therefor to apply a loading force to an element positioned within and movable with respect to a stationary housing, said support being fixedly mounted on an exterior portion of said housing and having a pair of parallel and spaced arms extending transversely from said support beyond said housing and joined at the outer extremity thereof, a nut fixedly mounted in said joined portion of said arms with the axis thereof substantially parallel to the axis of motion of said element, said pressure regulating means comprising a lever having a rigid portion with an antifriction pivoted mount at one end thereof on said support and a hardened metallic ball partially embedded in a surface thereof engageable with said element, said lever having an elongated resilient portion fixed adjacent one end thereof to said rigid portion, said resilient portion extending beyond and away from the end of said rigid portion remote from the pivoted mounted end thereof between said spaced arms of said support and having a bevelled groove in a surface thereof adjacent the end of said resilient portion opposite said fixed end thereof and a lever adjusting rod having a threaded portion in engagement with said nut and an end of said rod terminating with an hemispherical configuration engageable with the bevelled portion of said slot whereby said resilient portion of said lever may be adjustably flexed to apply through said rigid portion and said ball a loading force to said element, said rigid portion being otherwise unrestrained and freely rotatable about said pivoted mount toward and away from said element.

References Cited in the file of this patent

UNITED STATES PATENTS

| | | |
|---|---|---|
| 1,624,654 | Brittain | Apr. 12, 1927 |
| 1,835,459 | Brittain | Dec. 8, 1931 |
| 1,966,720 | Henning | July 17, 1934 |
| 2,156,496 | Handwork | May 2, 1939 |
| 2,274,319 | Chesterman | Feb. 24, 1942 |
| 2,293,315 | Spence | Aug. 18, 1942 |
| 2,298,112 | Edwards | Oct. 6, 1942 |
| 2,306,066 | Jacobsen | Dec. 22, 1942 |
| 2,424,511 | Stanley | July 22, 1947 |
| 2,474,355 | Griswold | June 28, 1949 |

FOREIGN PATENTS

| | | |
|---|---|---|
| 657,088 | Germany | of 1938 |